United States Patent [19]

Kent et al.

[11] 3,960,988

[45] June 1, 1976

[54] VULCANIZATION OF BROMOBUTYL

[75] Inventors: Eric George Kent; John Walker, both of Sarnia, Canada

[73] Assignee: Polysar Limited, Ontario, Canada

[22] Filed: Nov. 22, 1974

[21] Appl. No.: 526,254

Related U.S. Application Data

[63] Continuation-in-part of Ser. No. 396,146, Sept. 11, 1973.

[52] U.S. Cl. .................................................. 260/879
[51] Int. Cl.$^2$ ..................... C08L 9/00; C08L 47/00
[58] Field of Search ................. 260/85.3 R, 85.3 C, 260/85.3 H, 879

[56] References Cited
UNITED STATES PATENTS

| | | | |
|---|---|---|---|
| 2,944,578 | 7/1960 | Baldwin | 260/890 |
| 3,085,074 | 4/1963 | Burke, Jr. et al. | 260/879 |
| 3,342,789 | 9/1967 | Bannister et al. | 260/879 |
| 3,775,387 | 11/1973 | Baldwin | 260/879 |

FOREIGN PATENTS OR APPLICATIONS

| | | | |
|---|---|---|---|
| 891,842 | 3/1962 | United Kingdom | 260/879 |

*Primary Examiner*—Murray Tillman
*Assistant Examiner*—J. Ziegler
*Attorney, Agent, or Firm*—Stevens, Davis, Miller & Mosher

[57] ABSTRACT

Bromobutyl alone or blended with other free radical curable polymers or with free radical curable monomers can be vulcanized by heating in the presence of free radical agents.

7 Claims, No Drawings

VULCANIZATION OF BROMOBUTYL

This application is a continuation-in-part of application Ser. No. 396,146, filed Sept. 11, 1973.

This invention is directed to a novel process of vulcanizing halogenated butyl rubber, optionally in the presence of vulcanizable copolymers and/or vulcanizable monomers, and to the vulcanizates so obtained.

Rubbery isoolefin polymers comprising a copolymer of a major proportion of a $C_4$–$C_8$ isoolefin and a minor proportion of a $C_4$–$C_8$ conjugated diolefin are well known in the art. Such copolymers may be prepared by the polymerization of a mixture of said isoolefin and said conjugated diolefin, normally in the presence of an inert diluent, at a temperature in the range of about −150°C to about 50°C in the presence of a cationic catalyst being a Lewis acid. Commercially available polymers known as butyl rubber comprise copolymers of isobutylene and isoprene.

Halogenated isoolefin polymers are known in the art and comprise copolymers of a major proportion of a $C_4$–$C_8$ isoolefin and a minor proportion of a $C_4$–$C_8$ conjugated diolefin which copolymer has been subjected to a halogenation reaction whereby halogen is incorporated into said copolymer. Isobutylene-isoprene copolymers which additionally contain one of chlorine or bromine are commercially available.

Such halogenated isoolefin polymers may be vulcanized by reaction with a metal oxide compound and by reaction with suitable sulphur-containing organic compounds. Vulcanization with a metal oxide is believed to occur by reaction of the metal oxide with the halogen of the polymer whereas vulcanization with suitable sulphur-containing organic compounds is believed to occur by reaction of the sulphur compound, or a material derived therefrom, with the carbon-carbon double bonds of the polymer.

It is an objective of this invention to provide a process for the vulcanization of halogenated isoolefin polymers. It is a further objective of this invention to provide vulcanizable compositions comprising halogenated isoolefin polymers.

It has now been unexpectedly discovered that halogenated isoolefin polymers can be vulcanized with free radical curing agents to yield vulcanizates having useful properties.

Additionally, due to the discovery that halogenated isoolefin polymers can be vulcanized with free radical curing agents, it is now possible to cure blends of halogenated isoolefin polymers with other rubbery or resinous polymers which are curable with free radical curing agents and it is now possible to cure halogenated isoolefin polymers mixed with free radical polymerizable organic monomers.

The present invention is directed to a process for the vulcanization of compositions comprising 100 parts by weight of a halogenated polymer of an isoolefin and 0.1 to 5 parts by weight of a free radical curing agent which comprises heating said mixtures to temperatures of about 250°F to about 400°F for about 2 to about 120 minutes and is directed to the vulcanizable compositions comprising said mixtures.

It has been known for a considerable time that isoolefin polymers including butyl rubber cannot be vulcanized with free radical curing agents due to the fact that the reaction of such curing agents with said isoolefin polymers causes degradation or reduction of the molecular weight of the polymer and causes the establishment of only a limited number of crosslinks from one polymer chain to another.

Canadian Pat. No. 817,939 discloses that a certain class of isoolefin polymers can be vulcanized with free radical curing agents. The said isoolefin polymers are those obtained by copolymerizing 80 to 99.8 weight percent of an isoolefin of 4 to 7 carbon atoms, 0 to 19.8 weight percent of an aliphatic diene of from 4 to 14 carbon atoms and from 0.2 to 5 weight percent of an aromatic divinyl compound of the formula

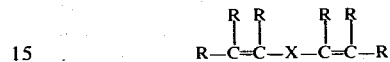

where X represents an aromatic nucleus. These aromatic divinyl compound containing isoolefin polymers are clearly distinguishable from the halogenated isoolefin polymers of the present invention.

The preparation of isoolefin polymers is well known in the art. An isoolefin selected from the $C_4$–$C_8$ isoolefins, such as isobutylene, is admixed with a conjugated diolefin having 4–8 carbon atoms, such as butadiene and isoprene, such that the isoolefin constitutes from 85 to 99.5 parts by weight and the conjugated diolefin constitutes from 0.5 to 15 parts by weight of the mixture. An inert diluent is also admixed therewith, said inert diluent being selected from the $C_4$ to $C_6$ aliphatic alkanes and chlorinated hydrocarbon compounds such as methyl chloride, ethyl chloride, methylene chloride and ethylene dichloride. The isoolefin conjugated diolefin mixture may form from about 10 percent by weight to about 50 percent by weight of the total isoolefin-conjugated diolefin-inert diluent mixture. This total mixture is cooled and passed into a reactor equipped with suitable cooling means to maintain the polymerization temperature at from about 0°C to about −150°C wherein it is admixed with a cationic catalyst such as aluminum chloride, aluminum bromide, aluminum ethyl dichloride, titanium tetrachloride and boron trifluoride etherate. Polymerization of the isoolefin conjugated diolefin mixture proceeds rapidly and the polymer-diluent-unreacted monomers mixture is transferred to means whereby the polymer is separated and recovered in suitable form.

A preferred isoolefin polymer, being an isobutylene-isoprene copolymer (butyl rubber), may be so prepared in the presence of methyl chloride as diluent and using aluminum chloride as catalyst.

The recovered isoolefin polymer may be halogenated by means known in the art. The solid isoolefin polymer may be reacted on a hot rubber mill with a compound which releases halogen, such as nitrogen halo-succinimide and nitrogen halo-hydantoin. Alternatively, the isoolefin polymer may be dissolved in an inert hydrocarbon solvent such as pentane, hexane or cyclohexane and to the polymer solution may be added elemental halogen or a halogen-releasing compound. In a commercial process, butyl rubber is dissolved in a solvent to yield a solution containing from about 5 to about 30 weight percent of rubber and elemental chlorine or bromine is added to the solution in sufficient quantity that the chlorinated or brominated rubber recovered contains up to one atom of chlorine or up to three atoms of bromine per carbon-carbon double bond originally in the butyl rubber.

The halogenated isoolefin polymers which may be vulcanized by reaction with free radical curing agents by the process of this invention are isoolefin polymers in which the isoolefin is selected from a $C_4$ to $C_8$ isoolefin, said isoolefin being copolymerized with a conjugated diolefin having from 4 to 8 carbon atoms such that the isoolefin forms from 85 to 99.5 weight percent of the hydrocarbon content of the polymer and the conjugated diolefin forms from 0.5 to 15 weight percent of the hydrocarbon content of the polymer, which isoolefin polymers contain a halogen selected from chlorine and bromine in an amount from about 0.5 to about 12 weight percent of the halogenated polymer. Preferably the isoolefin polymer is a polymer of isobutylene and isoprene. More preferably the isobutylene content of said isobutylene-isoprene polymer is from 96 to 99.5 weight percent. Preferably the halogenated isoolefin polymer is an isobutyleneisoprene polymer containing not more than one atom of chlorine or not more than three atoms of bromine per double bond present in the isoolefin polymer. More preferably the halogenated isoolefin polymer is an isobutylene-isoprene polymer containing from 96 to 99.5 weight percent of isobutylene based on the hydrocarbon content of the polymer and from 0.5 to 2 weight percent of chlorine or from 0.5 to 5 weight % of bromine based on the halogenated polymer.

In the process of this invention, such halogenated isoolefin polymers are vulcanized by interaction, under the influence of heat, with a free radical curing agent admixed therewith. Optionally, additional co-curable compounds may also be present.

The preferred free radical curing agents are the organic peroxidic compounds. Organic peroxidic curing agents include the alkyl, aryl, acyl and aralkyl peroxides. Suitable organic peroxidic curing agents may be exemplified as including dicumyl peroxide, dibenzoyl peroxide, di-tertiary butyl peroxide, lauroyl peroxide, 2,5 di-(tertiary butyl peroxy)-2,5-dimethyl hexane and 1,1-di(tertiary butyl peroxy)-3,3,5-trimethylcyclohexane. Other suitable organic peroxidic compound curing agents are the hydroperoxides, for example, cumyl hydroperoxide and tertiary butyl hydroperoxide, and the peresters, for example tertiary butyl perbenzoate.

The quantity of free radical curing agent which may be used to cause the vulcanization of halogenated isoolefin polymers is from 0.1 to 5 parts by weight per 100 parts by weight of the halogenated isoolefin polymer. The preferred quantity of free radical curing agent is from about 0.5 to about 3 parts by weight. The actual amount of curing agent used is influenced by the presence of other vulcanizable materials also in admixture with the halogenated isoolefin polymer, such that greater amounts of curing agent may be necessary when some portion thereof is utilized to cause the vulcanization of the other materials. Additionally, the quantities of curing agent hereinbefore stated are the true amounts of such material present. Many such commercially available curing agents are not sold as pure materials. For example, dicumyl peroxide may be obtained as a product containing 40% active peroxide diluted with a non-peroxide material and must be used by making correction to the actual quantity used in order to have present the desired quantity of active peroxide.

Also within the scope of the process of this invention, the halogenated isoolefin polymers may be mixed with other rubbery or resinous polymeric materials which are also vulcanizable with free radical curing agents and with a free radical curing agent and the mixture vulcanized under the influence of heat. These other rubbery or resinous polymeric materials may be saturated or unsaturated and include polyethylene and polypropylene as examples of resinous polymeric materials and polybutadiene, styrene-butadiene polymers, ethylene-propylene polymers, ethylene-propylene-diene polymers, butadiene-acrylonitrile polymers and natural rubber as examples of rubbery polymeric materials. Such polymeric materials may be blended with the halogenated isoolefin polymers by any of the means well known in the art including mill mixing and Banbury mixing at suitable temperatures to ensure good dispersion of both polymers with each other. The amount of other polymeric materials which may be blended with the halogenated isoolefin polymers are from 5 to 90 parts by weight per 100 parts by weight of halogenated isoolefin polymer, preferably from 10 to 50 parts by weight.

Also within the scope of the process of this invention, the halogenated isoolefin polymers may be mixed with free radical curable monomeric organic compounds and the mixture vulcanized under the influence of heat. Suitable curable monomeric organic compounds are those having at least two polymerizable ethylenically unsaturated groups. It is preferred that these compounds be substantially non-volatile liquids at the temperatures at which they are mixed with the halogenated isoolefin polymers and contain at least 5 carbon atoms. Examples of these compounds include the unsaturated polyesters formed by reaction of polyhydric alcohols with unsaturated monobasic carboxylic acids, the unsaturated polyesters formed by reaction of polybasic carboxylic acids with unsaturated alcohols. Suitable polyesters include those formed by the reaction of an unsaturated carboxylic acid having at least 3 carbon atoms, such as acrylic acid, methacrylic acid, cinnamic acid and crotonic acid, with a polyhydric alcohol having at least 2 carbon atoms such as ethylene glycol, diethylene glycol, glycerol and pinacol, such reactions being controlled to yield at least two ester groups in the product. Suitable polyesters also include those formed by the reaction of polybasic carboxylic acids having at least 3 carbon atoms, such as malonic acid, succinic acid, adipic acid, maleic acid, fumaric acid, itaconic acid and phthalic acid, with unsaturated alcohols having at least 2 carbon atoms such as vinyl alcohol, allyl alcohol and methallyl alcohol. Preferred esters are ethylene glycol dimethacrylate and tetraethylene glycol dimethacrylate. Suitable curable monomeric organic compounds also include diallyl, triallyl and divinyl compounds such as diallyl cyanurate, triallyl cyanurate and divinyl benzene. The amount of curable monomeric organic compound that may be blended with the halogenated isoolefin polymers is within the range of about 5 to about 50 parts by weight per 100 parts by weight of the halogenated isoolefin polymer, preferably from about 10 parts to about 35 parts by weight.

It is within the scope of this invention that the vulcanizable compositions comprising halogenated isoolefin polymer and free radical curing agent may also contain one or more components which can themselves act as curing agent for the halogenated isoolefin polymer. Such components include metal oxides such as zinc oxide and sulphur-containing curing agents well known in the art.

The halogenated isoolefin polymers, whether alone or mixed with other rubbery or resinous polymeric materials or mixed with curable monomeric organic compounds, may be mixed with fillers well known in the art. Such fillers may be reinforcing or non-reinforcing materials and may be used in amounts from about 10 to about 200 parts by weight per 100 parts by weight of halogenated isoolefin polymer. Suitable fillers include carbon black, silica, aluminum silicate, calcium silicate, clay, calcium carbonate, talc, titanium dioxide and mixtures thereof. Coloring agents may also be incorporated.

The halogenated isoolefin polymers are mixed with the curing agent and with other components on an open mill or in an internal mixer at temperatures of from about room temperature up to about 350°F. Generally, the free radical curing agent is incorporated at a low mixing temperature in order to avoid premature curing of the compounded mixture. When mixing the halogenated isoolefin polymers with other rubbery or resinous polymeric materials the mixing temperature will generally be above about 150°F in order to obtain a homogeneous mixture and the free radical curing agent may be added to the mixture in a second stage at a lower temperature such as by mill mixing at about 100°F.

The halogenated isoolefin polymer compound, after shaping to a suitable form, is vulcanized by heating at a temperature from about 250°F to about 400°F for a period of time from about 2 minutes to about 120 minutes. The temperature and time for vulcanization is affected by the choice of free radical curing agent and is dependent on the temperature at which the free radical curing agent rapidly decomposes to release free radicals and the time which such decomposition requires to cause the essentially complete release of free radicals from the curing agent both of which are well known in the art. Preferred conditions for vulcanization are times from about 5 minutes to about 30 minutes at temperatures of from about 250°F to about 350°F.

The vulcanized materials so produced have satisfactory stress-strain properties and hardness for a wide range of commercial applications. Good aging characteristics are also demonstrated by these vulcanizates, especially under conditions of elevated temperature testing.

The following examples serve to illustrate the invention and are not to be considered limiting to the invention. All parts are parts by weight unless otherwise identified.

EXAMPLE 1

Using mill mixing procedures, with a mill temperature of about 80°F and mixing times sufficient to obtain good dispersion of the ingredients, the compounds listed in Table I were prepared, formed into sheets of about 0.25 cm thickness and vulcanized as shown. The bromobutyl had a Mooney (ML 1 + 12 at 257°F) of 42 and contained 2.1 weight % bromine, the chlorobutyl had a Mooney (ML 1 + 12 at 257°F) of 50 and contained 1.1 weight % chlorine, the dicumyl peroxide was a commercially available material containing 40% active dicumyl peroxide mixed with an inert material and the particulate silica of experiment F was a precipitated silica having 84% $SiO_2$ and a specific gravity of 1.95.

TABLE I

| Experiment No. | Recipe | Parts | Vulcanization Time/Temp. mins/°F | 300% Modulus $Kg/cm^2$ | Tensile Strength $Kg/cm^2$ | Elongation % |
|---|---|---|---|---|---|---|
| A | Bromobutyl | 100 | 10/260 | 5 | 11 | 570 |
|   | Dicumyl peroxide | 2.5 | | | | |
| B | Bromobutyl | 90 | 10/260 | 5 | 24 | 720 |
|   | 1,3 Butylene glycol dimethylacrylate | 10 | | | | |
|   | Dicumyl peroxide | 2.5 | | | | |
| C | Bromobutyl | 75 | 10/260 | 4 | 22 | 740 |
|   | 1,3 Butylene glycol dimethylacrylate | 25 | | | | |
|   | Dicumyl peroxide | 2.5 | | | | |
| D | Bromobutyl | 60 | 10/260 | 16 | 45 | 540 |
|   | 1,3 Butylene glycol dimethacrylate | 40 | | | | |
|   | Dicumyl peroxide | 2.5 | | | | |
| E | Bromobutyl | 100 | 30/307 | 21 (100% modulus) | 30 | 130 |
|   | Zinc diacrylate | 37 | | | | |
|   | Dicumyl peroxide | 1.5 | | | | |
| F | Bromobutyl | 100 | 30/307 | 34 | 89 | 530 |
|   | Particulate silica | 15 | | | | |
|   | Trimethylol propane trimethacrylate | 10 | | | | |
|   | Dicumyl peroxide | 1.5 | | | | |
| G | Chlorobutyl | 100 | 30/307 | 2 | 7 | 1090 |
|   | Dicumyl peroxide | 2.5 | | | | |

The stress-strain data show that the vulcanizates all possess rubbery properties and were true vulcanizates.

EXAMPLE 2

A bromobutyl compound was prepared by mixing on a mill 100 parts of bromobutyl (Mooney ML 1 + 12 at 257°F = 47, bromine content 1.9 weight %), 50 parts of high modulus semireinforcing furnace black and 2.5 parts of a compound containing 40% of active dicumyl peroxide, the mixing being for about 20 minutes and the mill temperature being about 80°F. The compound was then sheeted out from the mill to a thickness of 0.25 cms and put into a mold and cured for 20 minutes at 153°C. The vulcanizate sheet was cut into dumbbells for determination of the stress-strain properties. The tensile strength was found to be 99 kg/cm², the elongation at break was 590 percent and the modulus at 300 percent elongation was 43 kg/cm². These properties clearly demonstrate the vulcanizates of good strength may be obtained by the process of this invention.

EXAMPLE 3

A sample of bromobutyl (100 parts), having a bromine content of 2.1 weight percent and a Mooney (ML 1 + 12 at 257°F) of 42, was compounded on a cool (77°F) mill with 5 parts of zinc oxide. This compound was divided into two portions, one being a control outside the scope of this invention and to the other was added dicumyl peroxide in the form of a commercial product containing 40% active dicumyl peroxide. The compounds were formed into sheets 0.25 cm thick, transferred to teflon-lined metal molds and heated at 153°C for the times specified in Table II. Dumbbells were cut out from the vulcanized sheets so produced and the stress-strain properties determined. Further sheets were aged at 150° for the times specified in Table II and the stress-strain properties determined.

portion was added 50 parts of high modulus semi-reinforcing furnace black, 40 parts of 1,3 butylene glycol dimethacrylate and 5 parts of dicumyl peroxide (40 percent active). These compounds were formed into sheets, cured and the stress-strain and compression set properties were determined, with the results in Table III.

TABLE III

| | | | |
|---|---|---|---|
| Masterbatch | parts | 156 | 156 |
| Carbon black | parts | 50 | 50 |
| Butadiene--acrylonitrile copolymer | parts | 100 | — |
| 1,3-Butylene glycol dimethacrylate | parts | — | 40 |
| Dicumyl peroxide (40% active) | parts | 5 | 5 |
| Cure - minutes at 153°C | | 30 | 15 |
| Tensile strength | kg/cm$^2$ | 39 | 80 |
| 300% Modulus | kg/cm$^2$ | 14 | 29 |
| Elongation | % | 690 | 580 |
| Age 70 hours at 121°C compression set | % | 64 | 69 |

TABLE II

| Compound Composition | (Control) | | | | | |
|---|---|---|---|---|---|---|
| Bromobutyl parts | 100 | | | 100 | | |
| Zinc Oxide parts | 5 | | | 5 | | |
| Dicumyl peroxide (40% active) parts | — | | | 2.5 | | |
| Cure time at 153°C (mins.) | 10 | 20 | 30 | 10 | 20 | 30 |
| Stress-strain properties | | | | | | |
| Modulus at 300% elongation kg/cm$^2$ | 3.2 | 4.9 | 5.9 | 8.0 | 4.0 | 6.9 |
| Tensile strength kg/cm$^2$ | 1.4 | 31.2 | 13.1 | 18.9 | 15.5 | 12.2 |
| Elongation at break % | >1000 | 850 | 600 | 530 | 520 | 480 |
| Age 24 hours at 150°C | | | | | | |
| Modulus at 300% elongation kg/cm$^2$ | 4.7 | 5.1 | 6.4 | 9.4 | 10.2 | 9.5 |
| Tensile strength kg/cm$^2$ | 24.5 | 38.7 | 36.6 | 32.0 | 25.4 | 25.2 |
| Elongation at break % | 700 | 770 | 720 | 560 | 510 | 530 |
| Age 48 hours at 150°C | | | | | | |
| Modulus at 300% elongation kg/cm$^2$ | 2.9 | 3.2 | 5.0 | 8.0 | 8.0 | 6.2 |
| Tensile strength kg/cm$^2$ | 15.0 | 18.7 | 12.2 | 28.0 | 27.6 | 25.9 |
| Elongation at break % | 800 | 830 | 570 | 600 | 610 | 650 |
| Age 120 hours at 150°C | | | | | | |
| Modulus at 300% elongation kg/cm$^2$ | Too soft | 4.9 | Too soft | | | |
| Tensile strength kg/cm$^2$ | for measurement | 21.4 | for measurement | | | |
| Elongation at break % | | 650 | | | | |

The data in Table II show that the vulcanizates obtained when a peroxide was used in the curing system achieved acceptable properties at short cure times and retained the properties of the vulcanizates on aging as shown by the stress-strain properties after 48 hours of aging at 150°C.

EXAMPLE 4

A masterbatch of bromobutyl which contained 100 parts of bromobutyl (bromine content 1.8 weight %, Mooney ML 1 + 12 at 257°F of 47), 50 parts of a high modulus semireinforcing furnace black, 5 parts of zinc oxide and 1 part of stearic acid was divided into two portions. To one portion was added 50 parts of high modulus semi-reinforcing furnace black, 100 parts of an emulsion prepared butadiene-acrylonitrile copolymer containing about 34% acrylonitrile and having a Mooney (ML 1 + 4 at 212°F) of 47, and 5 parts of dicumyl peroxide (40 percent active). To the other

EXAMPLE 5

Compounds were prepared by mixing 50 parts of bromobutyl (containing 1.9 weight % bromine and having a Mooney ML 1 + 12 at 125°C of 47) with 50 parts of another rubber or resin (see Table IV), the mixing being on a mill at as low a temperature as possible compatible with achieving a uniform mixture. To these compounds were added on a cool mill 2.5 parts of 40 percent active dicumyl peroxide and the compound then sheeted out to a thickness of 0.25 cm. The sheets were transferred to metal molds lined with teflon and cured for 30 minutes at 153°C. The vulcanizate sheets so produced were cut into dumbbells for determination of the stress-strain properties. The results are given in Table IV.

TABLE IV

| Other rubber or resin | 300% Modulus kg/cm² | Tensile Strength kg/cm² | Elongation % |
|---|---|---|---|
| Low density (0.92) polyethylene (melt index 25g/10 minutes) | 4.2 | 7.4 | 600 |
| Ethylene-propylene-diene rubber - EPSYN 40*** | 8.5 | 18.9 | 650 |
| Polybutadiene - TAKTENE 1203* | 22.9 | 23.6 | 310 |
| Natural rubber - No. 1 smoked sheet | 3.7 | 21.3 | 680 |
| Butadiene-acrylonitrile rubber - KRYNAC 803* | 9.5 | 37.7 | 670 |
| Oil-extended styrene-butadiene rubber - KRYNOL 1778* | 8.5 | 26.4 | 610 |
| Trans-polyisoprene - TRANS-PIP* | 63.1 | 118.9 | 450 |
| Polychloroprene - Neoprene-W** | 13.7 | 32.3 | 430 |
| Styrene-butadiene rubber - KRYLENE 1502* | 16.5 | 21.0 | 350 |

*Trademarks of Polymer Corporation Limited
**Trademark of E. I. du Pont de Nemours & Co., Inc.
***Trademark of Copolymer Rubber & Chemical Co.

The uncured compounds had elongations in excess of 1000 percent, showing that the compounds were not rubbery in nature, with the exception of that containing the trans-polyisoprene. The trans-polyisoprene containing compound had an elongation of 400 percent and a tensile strength of 93 Kg/cm² which are due to the highly crystalline nature of the trans-polyisoprene in the compound. All of the vulcanizates were rubbery, the results showing that vulcanization of the mixture in each compound had occurred.

EXAMPLE 6

A masterbatch was prepared containing 100 parts of bromobutyl (bromine content 1.9 weight %, Mooney (ML 1 + 12 of 48 at 125°C), 50 parts of a semi-reinforcing furnace carbon black, 5 parts of zinc oxide and 1 part of stearic acid. This was divided into 5 portions, one of which was used as a control and to the other four were added different amounts of 40% active dicumyl peroxide, as shown in Table V. Zinc oxide acts as a vulcanizing agent for bromobutyl and the dicumyl peroxide acts as an additional vulcanizing agent. These compounds were cured at 153°C for the times shown and the stress-strain properties were determined on the unaged vulcanizates and on vulcanizates aged at 150°C for 24 and 48 hours, the results being given in Table V. The results show that the presence of the peroxide causes an increase in the rate of cure and an improvement in the retention of properties on aging.

TABLE V

| Compound | 1 (Control) | | 2 | | 3 | | 4 | | 5 | |
|---|---|---|---|---|---|---|---|---|---|---|
| Quantity of dicumyl peroxide, pts. per 100 pts. bromobutyl | | | 1.5 | | 2.0 | | 2.5 | | 3.0 | |
| Cure time at 153°C mins. | 10 | 15 | 10 | 15 | 10 | 15 | 10 | 15 | 10 | 15 |
| 300% Modulus Kg/cm² | 17.1 | 66.9 | 34.3 | 66.9 | 45.6 | 56.9 | 64.9 | 56.9 | 61.9 | 62.7 |
| Tensile Strength Kg/cm² | 42.8 | 116.0 | 129.9 | 145.7 | 115.0 | 113.7 | 122.3 | 113.7 | 133.1 | 97.6 |
| Elongation % | 770 | 430 | 600 | 560 | 530 | 490 | 490 | 460 | 530 | 400 |
| Age 24 hours at 150°C | | | | | | | | | | |
| 300% Modulus Kg/cm² | 53.7 | 40.9 | 49.2 | 43.2 | 53.8 | 56.2 | 60.2 | 44.7 | 60.1 | 58.8 |
| Tensile Strength Kg/cm² | 71.6 | 48.6 | 65.7 | 56.2 | 68.1 | 66.3 | 78.8 | 60.4 | 75.1 | 71.7 |
| Elongation % | 400 | 380 | 430 | 430 | 390 | 370 | 430 | 420 | 420 | 390 |
| Age 48 hours at 150°C | | | | | | | | | | |
| 300% Modulus Kg/cm² | 30.8 | 25.9 | 25.6 | 20.7 | 29.4 | 28.7 | 31.9 | 26.2 | 37.4 | 34.8 |
| Tensile Strength Kg/cm² | 37.6 | 31.5 | 31.5 | 26.1 | 32.2 | 38.0 | 39.8 | 33.2 | 44.1 | 40.9 |
| Elongation % | 420 | 450 | 430 | 480 | 330 | 460 | 420 | 430 | 390 | 380 |

EXAMPLE 7

Using the procedure of Example 1, the compositions shown in Table VI were prepared. The only variance in the procedure was that the acrylate monomer was separately mixed with a part of the filler prior to addition to the rubber banded on the mill. The sample of bromobutyl contained 1.7 weight percent bromine and had a Mooney (ML-12 at 125°C) of 46. The carbon black used was an SRF black. The silica used was a precipitated hydrated silica having an average particle size of 0.22 microns. All parts are parts by weight.

The compositions were vulcanized by heating for 20 minutes at 153°C and the stress strain properties were determined using the standard procedures. All of the vulcanizates can be seen to be rubbery materials having good strength properties.

TABLE VI

| Experiment No. | 1 | 2 | 3 | 4 | 5 |
|---|---|---|---|---|---|
| Bromobutyl rubber | 100 | 100 | 100 | 100 | 100 |
| Ethylene dimethacrylate | — | — | — | 30 | 30 |
| Butylene dimethacrylate | 25 | 25 | 25 | — | — |
| Silica | 7.5 | 7.5 | 50 | 50 | — |
| Carbon Black | — | — | — | — | 50 |
| Dicumyl peroxide | 2.5 | 5 | 5 | 5 | 5 |
| Vulcanizate properties | | | | | |
| 100% Modulus kg/cm² | 6.5 | 7.5 | 45 | 54 | 24 |
| 300% Modulus kg/cm² | 23 | 33 | — | — | 90 |
| Tensile Strength kg/cm² | 81 | 90 | 84 | 80 | 94 |
| Elongation % | 620 | 530 | 265 | 210 | 320 |
| Hardness Shore A 2 | 32 | 33 | 87 | 86 | 59 |

What is claimed is:

1. A composition vulcanizable by the action of heat which comprises 100 parts by weight of a halogenated polymer of an isoolefin, from about 5 to about 50 parts by weight of a monomeric organic compound and 0.1 to 5 parts by weight of a free radical organic peroxidic curing agent, said halogenated polymer of an isoolefin being a polymer containing, based on hydrocarbon content, from 85 to 99.5 weight percent of an isoolefin having from 4 to 8 carbon atoms and from 0.5 to 15 weight percent of a conjugated diolefin having from 4 to 8 carbon atoms, and having been treated to contain a halogen selected from chlorine and bromine, said halogen being present in said polymer up to 1 atom of chlorine or up to 3 atoms of bromine per carbon-carbon double bond in said polymer, said monomeric organic compound having at least two polymerizable ethylenically unsaturated groups and being curable by said curing agent.

2. The composition of claim 1 in which said monomeric organic compound is an unsaturated polyester formed by reaction of polyhydric alcohols with unsaturated monobasic carboxylic acids or by reaction of unsaturated monohydric alcohols with polybasic carboxylic acids.

3. The composition of claim 1 in which said monomeric organic compounds is selected from diallyl cyanurate, triallyl cyanurate and divinyl benzene.

4. The composition of claim 2 wherein said unsaturated polyester is selected from ethylene glycol dimethacrylate, tetraethylene glycol dimethacrylate, butylene glycol dimethacrylate, trimethylol propane trimethylacrylate and zinc diacrylate.

5. The composition of claim 1 wherein the free radical organic peroxidic curing agent is selected from an organic peroxide, an organic hydroperoxide and an organic perester.

6. The composition of claim 5 wherein said free radical organic peroxidic curing agent is an organic peroxide selected from the dicumyl peroxide, dibenzoyl peroxide, ditertiary butyl peroxide and lauroyl peroxide.

7. The composition of claim 1 which has been vulcanized by heating at about 250°F to about 400°F for from about 2 to about 120 minutes.

* * * * *